Sept. 27, 1966  A. BOSNA ET AL  3,275,795
WELDING APPARATUS

Filed Sept. 25, 1963  2 Sheets-Sheet 1

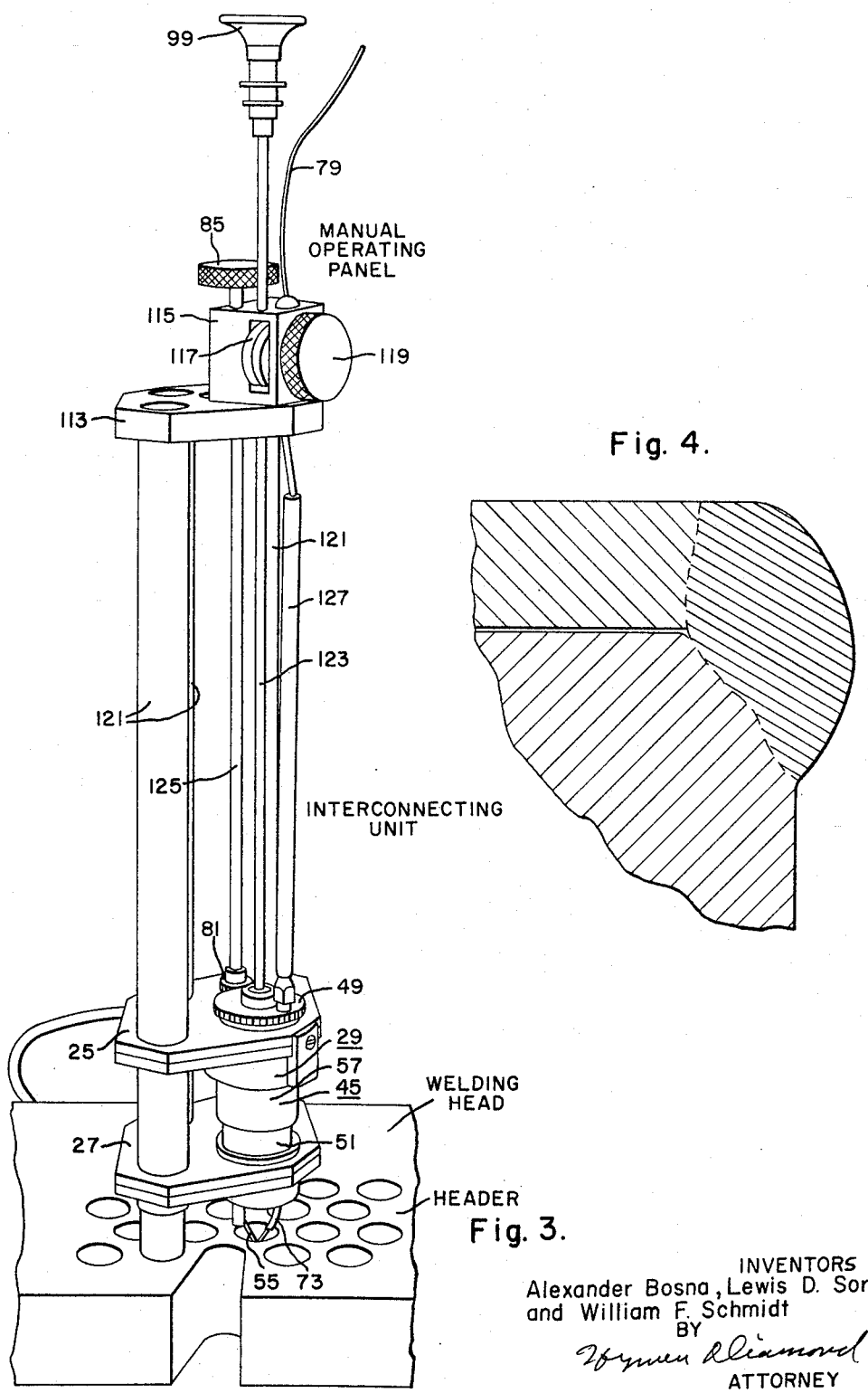

United States Patent Office 3,275,795
Patented Sept. 27, 1966

3,275,795
WELDING APPARATUS
Alexander Bosna, West Chester, Lewis D. Sorg, Finleyville, and William F. Schmidt, Pittsburgh, Pa., assignors to Westinghouse Electric Corporation, Pittsburgh, Pa., a corporation of Pennsylvania
Filed Sept. 25, 1963, Ser. No. 311,374
10 Claims. (Cl. 219—125)

This invention relates to arc-welding and has particular relationship to the welding of selected areas in a relatively inaccessible region. An important application of this invention in its specific aspects is in the repairing of, or correcting of deficiencies in, a heat exchanger of a power generator. Such a heat exchanger includes a plate or header into which are sealed a plurality of tubes for conducting the primary heating fluid. This fluid is supplied through a cap sealed over the header. The tubes are immersed in the secondary fluid and the flow of the primary fluid through the tubes heats the secondary fluid. In a typical situation, the primary fluid may be highly corrosive. It is then essential that the tubes be sealed pressure-tight into the header of the heat exchanger.

Typically when leakage of a tube or of its joint to the header is discovered during use, or during tests prior to the actual use of the apparatus, the defective tube is removed from the apparatus for metallographic and metallurgical study. So that the exchanger may be used the opening left by the removal of the tube must then be closed by a plug sealed to the header by a pressure tight metallurgical joint.

In accordance with the teachings of the prior art, attempts have been made to produce this seal by conventional processes. This prior are approach has proved cumbersome because of the inaccessibility of the header into which the plug must be sealed. Essentially the prior art practice requires that the heat exchanger be disassembled so that the header is freely accessible to the operator. Such an operation is time consuming and costly.

In another typical situation, it may be necessary to repair the welded joints in a header of a heat exchanger as just described or joints in related or like apparatus. Such joints may have tiny defects which it is necessary to reweld. To weld such defects, it is necessary that during the welding operation, the defects be located and the welding process applied to each one in its turn. The repair of such defects in accordance with the teachings of the prior art also requires accessibility which is not readily available. In addition, it may be necessary to repair very fine defects which are not readily visible and are not readily repaired by conventional welding methods.

It is an object of this invention to overcome the above-described difficulties.

It is a further object of this invention to provide apparatus with which it shall be feasible to plug with seal welds the openings left in a header of a heat exchanger, or to repair the welds of a heat exchanger, without disassembling the heat exchanger.

Another object of this invention is to provide apparatus for producing a welded joint in a relatively inaccessible region.

In accordance with this invention in its specific aspects, apparatus is provided in which the region being welded may be seen through a light conducting tube or rod the light-pickup surface of which is adjacent the welding electrode. Such a rod is sometimes referred to as a boroscope and is composed of total-refracting light conductors such as quartz, Lucite, fiber glass or the like. The light conducting rod is disposed in light receiving and conducting relationship with the region in which the welding is to be carried out. An arc-welding means is connected to the rod and is movable over the region to be welded.

The welding means has readily accessible facilities for setting the welding electrode at the points to be welded and for controlling the welding and the rod conducts the light from the region in which the welding is to take place to a position such that the operator may view the region while he operates these facilities. The welding may be carried out by setting the electrodes in welding position and producing an arc to form the weld with aid of the light conductor. The setting of the electrode for welding and the state of the weld may be determined by viewing the welding operation as it is progressing through the light conducting rod.

In welding a plug into a header where a tube has been removed, the unit including the welding electrode and the light conducting tube or rod may be inserted through a porthole in the cap which is over the header. The unit may be manipulated through another of the portholes and properly set in the position where the weld is to be carried out. The weld may then be carried out by viewing the region, setting the electrode in proper welding relationship to the joint to be welded firing an arc and moving the arc over the joint in welding relationship with the joint. The weld is shielded by a protective gas which is transmitted along the viewing rod or light conductor, maintaining the viewing rod spatter free and preventing the pickup surface from becoming overheated.

The novel features considered characteristic of this invention are disclosed generally above. For a clearer understanding of this invention both as to its organization and as to its method of operation, together with additional objects and advantages thereof, reference is made to the following description of specific embodiments taken in connection with the accompanying drawings, in which:

FIG. 3 is a view in perspective of a modification of this invention which may be used in the welding or repair of fissures or other defective areas of welds; and FIG. 4 is a copy of a photograph of a section of a weld produced with the apparatus shown in FIG. 3.

Figure 1:
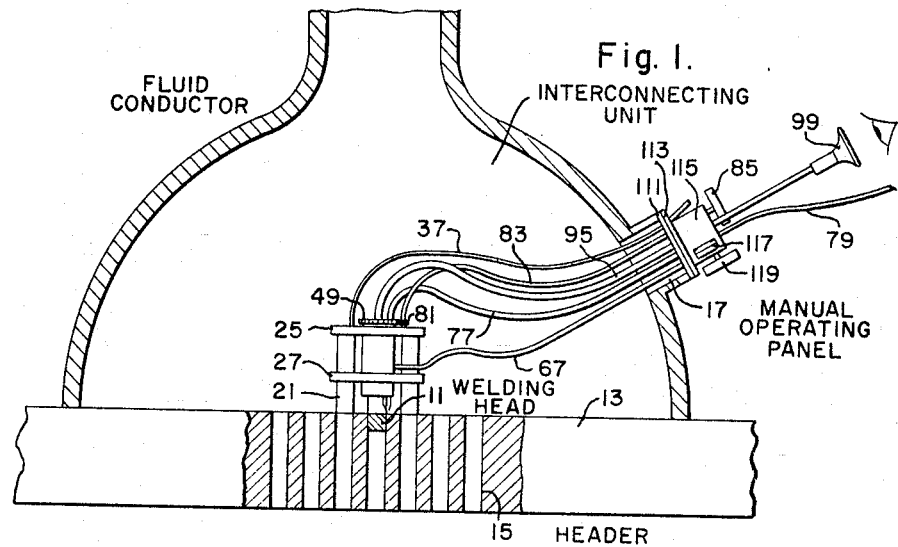
FIGURE 1 is a view partly in section showing a preferred embodiment of this invention.
Figure 2:
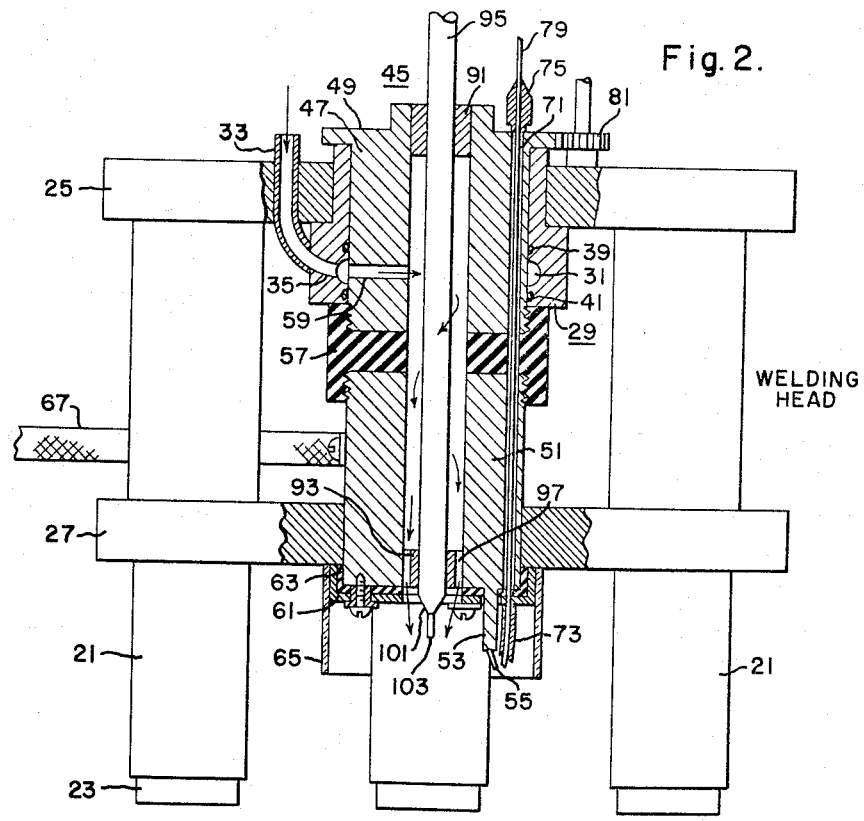
FIG. 2 is a view, enlarged, partly in section and partly in side elevation of the WELDING HEAD of the apparatus shown in FIG. 1.

The apparatus in accordance with this invention is shown in FIGS. 1 and 2 as used in the welding of a plug 11 in the HEADER of a heat exchanger without removing the FLUID CONDUCTOR which is in the form of a cap over the HEADER. The HEADER includes a plate 13 into which a plurality of tubes 15 are sealed pressure tight. In the typical practice of this invention, the tubes 15 may be metallurgically joined to the HEADER around their rims. The tubes 15 extend through the HEADER into a container (not shown) through which the secondary fluid of the heat exchanger flows and is heated.

The apparatus according to this invention includes a WELDING HEAD, an INTERCONNECTING UNIT, and a MANUAL OPERATING PANEL. The INTERCONNECTING UNIT is flexible. The FLUID CONDUCTOR is provided with portholes 17 through which the WELDING HEAD may be inserted and properly positioned for a welding operation.

The WELDING HEAD includes a plurality of positioning legs 21 having tips 23 formed so that the legs may be inserted in the openings in the tubes 15 sealed to the HEADER which are adjacent the opening into which the plug is to be sealed. The legs are secured to upper and lower plates 25 and 27 of insulating material and thus, essentially form a tripod unit.

The upper plate 25 supports a shouldered bearing 29 having a groove 31 around the lower portion of its inner surface. The groove 31 is connected to a tube 33 passing through the upper plate 25 and through a lateral hole 35 in the bearing 29. The tube 33 is connected to a flexible conductor 37 (FIG. 1) through which protective gas for example inert gas or carbon dioxide is supplied to the groove 31. On both sides of the groove 31 the bearing 29 has small circumferential grooves 39 in which O-rings 41 are disposed for sealing against gas leakage.

The WELDING HEAD also includes a hollow cylindrical torch body assembly 45 which is rotatable in the bearing 29 and in engagement with the wall of an opening in the lower plate 27 which also serves as a bearing. This assembly includes an upper hollow cylinder 47 carrying a gear 49 at the top and a lower hollow cylinder 51 from which a cylindrical tip 53 that carries the electrode 55 projects at the base. The electrode 55 may be of the usual nonconsumable tungsten type. The two hollow cylinders 47 and 51 are secured together into a unit by a hollow cylindrical holder 57 having internally threaded ends into which the hollow cylinders 47 and 51 are screwed. The holder 57 is composed of insulating material and insulates the electrode 55 from the hollow cylinder 47 carrying the gear 49.

The cylinder 47 is provided with a radial hole 59 which extends from its hollow inner periphery to the groove 31 around the periphery of the bearing 29. Shielding gas flows through the groove 31 and through the hole 59 in any position in which the hole happens to be as the assembly 45 rotates. The hole communicates with the openings in the cylinders 47 and 51 and the holder 57 and the gas flows through this opening. Leakage of gas at the joint between the bearing and the cylinder 47 from the groove is suppressed by the O-rings 39.

The lower cylinder 51 has secured to its lower end a cup-shaped cap 61 which is insulated from the cylinder by a cup-shaped insulator 63. A shield 65 of heat-resistant insulating material, such as PYREX glass or the like, is secured to the cap 61 for concentrating the protective gas. Electrical power is supplied to the electrode 55 through a flexible conductor 67 connected to the cylinder 51.

Coextensive axial openings 71 extend eccentrically near the outer peripheries through the upper and lower cylinders 47 and 51, the holder 57, the insulator 63 and the cap 61 and the intervening insulating joining unit. These openings communicate with a nozzle 73 brazed to the cap 61 and through a receptacle 75 communicate with a flexible cable 77 (FIG. 1). A filler wire 79 is supplied through the cable 77 and the receptacle 75, opening 71 and nozzle 73 to the region where the welding arc is produced.

The gear 49 is driven by a pinion 81 connected through a flexible shaft 83 (FIG. 1) in the INTERCONNECTING UNIT to an operating knob 85 (FIG. 1) on the MANUAL OPERATING PANEL. Rotation of the gear causes the assembly 45 to rotate so that the electrode 55 and wire 79 may be set in welding relationship with any point around the circle traced by their tips or may produce a peripheral welded joint.

The upper cylinder 47 has a bushing 91 near the top and the lower cylinder 51 has a fluted bushing 93 near the bottom. A light conductor 95 which may be a hollow cylindrical rod composed of a totally refracting material such as quartz or Lucite or the like, extends through the bushings 91 and 93. The light conductor is flexible and continues from the bushing 91 through the INTERCONNECTING UNIT to an eyepiece 99 in the MANUAL OPERATING PANEL.

The tip 101 of the light conductor 91 is generally conical and carries at the apex of the cone, an incandescent lamp or a glow lamp 103. The lamp is supplied with power through conductors (not shown) extending through the internal hollow portion of the light conductor to a terminal (not shown) on the eyepiece 99 which extends from the MANUAL OPERATING PANEL. The bushing 91 is solid and the protective gas can flow only through the flutes 97.

The bushings 91 and 93 are rotatable with the cylinders 47 and 51 and rotate relative to the light conductor 95.

Shielding gas, which may be a highly pure inert gas such as helium or argon is supplied through the tube 33 and the groove 31. The gas flows from the groove 31 through the hole 59 and through the annular space between the inner portion of the cylinders 47 and 51 and the holder 57 and through the flutes 97 in the lower bushing. This gas maintains the light receiving surfaces 101 of the light conductor 95 clean and free from deposits and also cools this surface and, in addition, provides a protective shielding atmosphere around the arc.

The INTERCONNECTING UNIT includes the flexible cable 77 for the filler wire 79, the flexible portion of the light conductor 95 and the gas conductor 37 connected to the tube 31 extending through the upper plate 25 of the WELDING HEAD. The INTERCONNECTING UNIT also includes the flexible shaft 83 connected to the knob 85 on the MANUAL OPERATING PANEL at one end and to the driving pinion 81 at the other. Rotation of the knob 85 causes the supporting unit for the electrode and the other parts to rotate.

The MANUAL OPERATING PANEL includes a mounting plate 111 from which a bracket 113 extends. The bracket 113 is of generally rectangular form having a slot 115 in one end in which a filler wire drive roll 117 and a cooperative idler (not shown) are mounted rotatably in bearings. The cooperative drive roll is operable by a knurled knob 119 suspended from the bracket 113. The filler wire 79 is advanced by rotation of the knob 119 between the drive roll 117 and the cooperative idler and passes through the flexible cable 77. The end of the flexible shaft 81 also passes through the bracket 115 and connects with the knurled knob 85 extending above the bracket. The shaft 77 and gear 49 may be rotated by rotating the knob 85. The light conductor also extends through the bracket 115 and terminates in the eyepiece.

In the use of the apparatus the defective tube is removed from the HEADER and the plug 11 is inserted in the opening to which the tube has been welded. The WELDING HEAD and the INTERCONNECTING UNIT are then inserted through one of the openings 17 in the FLUID CONDUCTOR or cap and positioned with the assembly 45 over the plug 11 with the legs 21 in the tubes 15 surrounding the plug and with the electrode 55 and filler wire 79 in welding relationship with the joint between the plug and the HEADER. The lamp 103 is in the end of a light conductor 95. The filler wire 79 is passed through the nozzle 73 so that adequate wire is available for the welding operation. The electrode 55 may be positioned and the filler wire 79 may be set by observing these parts through the light conductor 95. After the electrode and filler wire tip are properly positioned, gas is supplied through the gas tube 33 and the inner portion of the electrode mounting assembly 45 and an arc is fired. The operator, by manipulating the knobs 85 and 119 on the MANUAL OPERATING PANEL, then rotates the arc while supplying the filler wire 79 and produces the desired weld.

The apparatus shown in FIG. 3 is similar to that shown in FIGS. 1 and 2 except that the INTERCONNECTING UNIT is made up of a plurality of linear rather than curved parts. This apparatus includes a plurality of legs 121 adapted to be engaged in the openings or the tubes of a HEADER and on which the plates 25, 27 and 113 are supported. The WELDING HEAD is similar to that disclosed in FIG. 2 and is mounted between the lower plates 25 and 27 as disclosed in reference to FIG. 2.

As in the apparatus shown in FIG. 2, a light conductor 123 extends through the center of the supporting assembly 45 for the welding electrode 55 and filler wire nozzle 73 and passes through the bracket 115 terminating in the eyepiece 99. The supporting assembly is rotated relative to the light conductor by the gear 49 formed integral with the upper cylinder 47. This gear is driven by the pinion 81 supported in bearings in the rectangular bracket 115 and operated by a knurled knob 85 coaxial with the gear and its shaft 125 and extending above the top of the bracket. The filler wire 79 is passed through a porcelain tube 127 and through the tubulation in the supporting assembly 45, as shown in FIG. 2, and is advanced by a drive roller 117 operable by a knurled knob 119 extending at right angles to the axis of the tube 127 through which the filler wire passes.

The apparatus shown in FIG. 3 operates in the same manner as the apparatus shown in FIGS. 1 and 2. The legs are inserted in tubes or openings in the HEADER so that the electrode and the adjacent filler wire are in welding position with reference to the joint to be welded. The gas is then supplied through the center of the supporting unit and thereafter, the arc is fired. Once the arc is fired, the electrode is rotated by rotation of the knob 85 extending coaxially with the pinion 81 through the bracket 115 and at the same time the filler wire 79 is advanced by rotation of the knob 119 in driving relationship with the filler wire. Satisfactory circumferential welds have been produced with the apparatus shown in FIG. 3, a sectioned weld so produced is shown in FIG. 4.

While preferred embodiments of this invention have been disclosed herein, many modifications thereof are feasible. This invention then is not to be restricted except insofar as is necessitated by the spirit of the prior art.

We claim as our invention:

1. Apparatus for producing a weld in a relatively inaccessible region comprising a conductor of light extending into said region in light-receiving and conducting relationship with said region, means for illuminating said region mounted on the end of said conductor adjacent said region, an arc-welding means connected to said conductor, and means connected to said arc-welding means for moving said arc-welding means into welding relationship with different points of said region each of which is visible through said conductor.

2. Arc-welding apparatus including a supporting member, means connected to said member for rotating said member, a welding electrode suspended from said member rotatable therewith around a predetermined periphery, and a light conductor extending axially through said member in viewing relationship with said periphery.

3. Arc welding apparatus including a welding head having a non-consumable electrode extending therefrom, driving means for moving said welding head to move said electrode connected to said welding head and including first manual means for operating said driving means, said welding head including a channel through which a filler wire is advanced into a welding arc produced at said electrode, and second manual means for advancing said wire into said arc.

4. Apparatus for producing a weld in a relativey inaccessible region comprising a conductor of light extending into said region in light receiving and conducting relationship with said region, arc welding means connected to said light conductor movable relative thereto to different points of said region in welding relationship with each said point, a gas concentrating shield in said region encircling, in gas concentrating relationship, the end of said conductor and at least the portion of said arc welding means to which the arc is produced, and means connected to said conductor for transmitting a gas along said conductor and through said shield to cool the part of said conductor in said region and to suppress the accumulation of light-obstructing deposit on said conductor and also to shield the arc produced by said arc-welding means.

5. Arc-welding apparatus for welding work in a region, said apparatus including a supporting member, means connected to said member for rotating said member, a conductor of light extending through said member into said region in light receiving and transmitting relationship with said region, a welding electrode suspended from said member rotatable therewith around a predetermined periphery, and means connected to said support for transmitting gas along said conductor for cooling the part of said conductor in said region and suppressing the accumulation of light-obstructing deposit on the surface thereof and also to shield the arc produced by said arc-welding means.

6. Apparatus for welding work in a relatively inaccessible region comprising a conductor of light extending from an accessible position into said region in light receiving and conducting relationship with said region, arc-welding means connected to said conductor, means connected to said arc-welding means for moving said arc welding means in welding relationship with different points of said work, said moving means extending from said arc welding means to said accessible position, and manual means at said accessible position for operating said moving means.

7. Welding apparatus for welding work including a hollow spindle having a longitudinal opening through its center including the axis of said spindle, an electrode extending from the base of said spindle in welding relationship with said work, bearing means for rotatably supporting said spindle, means connected to said spindle for rotating said spindle in said bearing means to rotate said electrode with reference to said work, said bearing means having a cylindrical groove and having means connected to said groove for supplying to said groove a protective gas welding, and a lateral opening in said spindle connecting said groove to the longitudinal opening in said spindle to transmit gas through said longitudinal opening to the region of said work with which said welding electrode is in welding relationship.

8. The welding apparatus of claim 7 wherein gas concentrating means is secured to the base for concentrating the protective gas over the region over which the welding electrode is in welding relationship with the work.

9. The welding apparatus of claim 7 including O-rings between the bearing and the contiguous surface of the spindle on both sides of said groove for suppressing leakage of gas through the joint between said spindle and said bearing.

10. Apparatus for welding work in a relatively inaccessible region comprising a conductor of light extending from an accessible position into said region in light receiving and conducting relationship with said regon, arc-weldng means connected to said conductor, means connected to said arc-welding means for moving said arc-welding means in welding relationship with different points of said work, said moving means extending from said arc-welding means to said accessible position, and manual means at said accessible position for operating said moving means, said arc-welding means including a non-consumable electrode and a filler wire both in welding relationship with said different points of said work and also including moving means including means for moving said electrode to said different points and also including means for advancing said wire into the welding arc fired at said electrode.

References Cited by the Examiner

UNITED STATES PATENTS

| | | | |
|---|---|---|---|
| 1,869,351 | 7/1932 | Lincoln | 219—60 |
| 2,064,085 | 12/1936 | Shippy | 219—60 |
| 2,557,046 | 6/1951 | Evans | 219—60 |
| 3,009,049 | 11/1961 | Stanley | 219—60 |
| 3,010,357 | 11/1961 | Hirschowitz | 88—1 |
| 3,059,540 | 10/1962 | Robinson | 88—98 |
| 3,064,120 | 11/1962 | Ache | 219—125 |
| 3,064,128 | 11/1962 | Duke. | |
| 3,134,894 | 5/1964 | Farnsworth | 219—125 |
| 3,207,408 | 9/1965 | Thome et al. | 219—60 X |

RICHARD M. WOOD, *Primary Examiner.*

JOSEPH V. TRUHE, ANTHONY BARTIS, *Examiners.*